Oct. 8, 1957
B. GRAFF
2,809,258
SNAP SWITCH, PARTICULARLY FOR
A TEMPERATURE CONTROLLER
Filed June 7, 1956
3 Sheets-Sheet 1
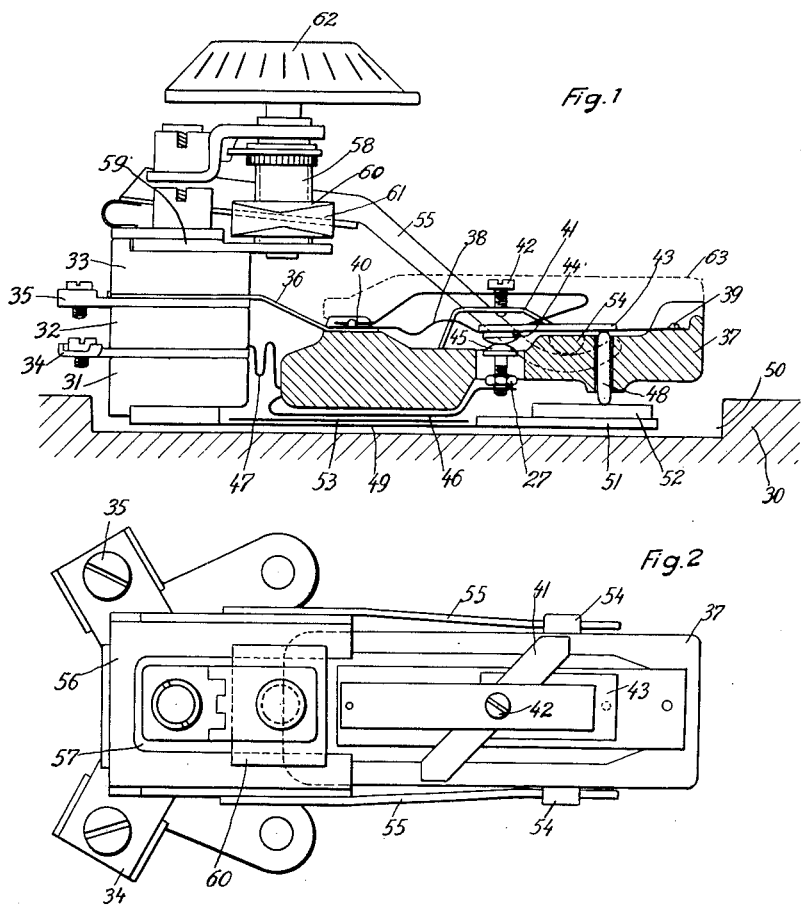
Inventor
BRUNO GRAFF
ATTORNEY

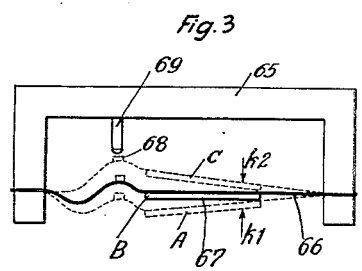
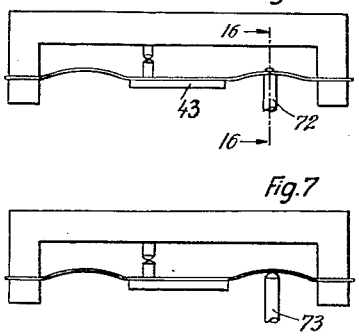
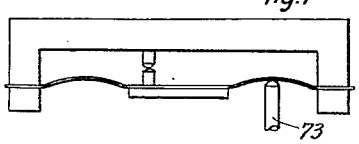
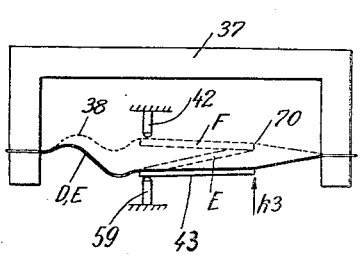
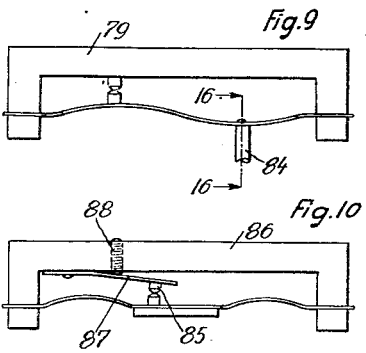
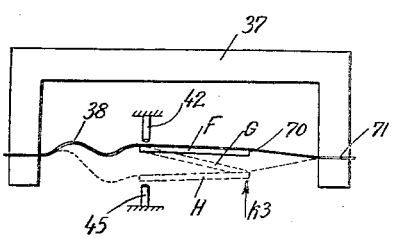
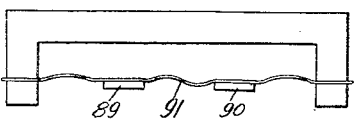
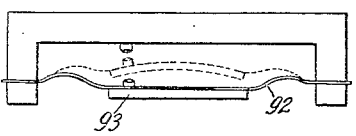
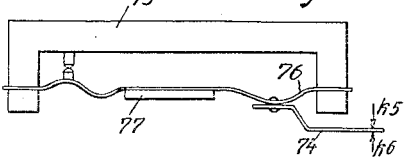

Oct. 8, 1957 B. GRAFF 2,809,258
SNAP SWITCH, PARTICULARLY FOR
A TEMPERATURE CONTROLLER
Filed June 7, 1956 3 Sheets-Sheet 3
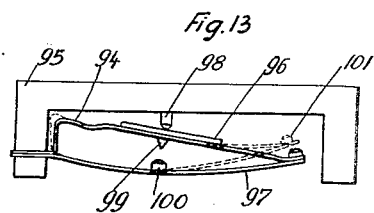
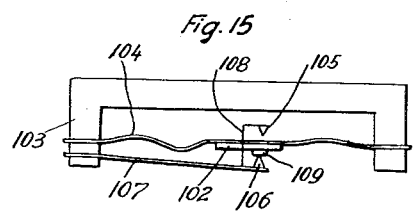
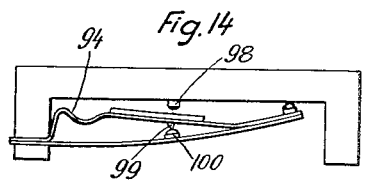
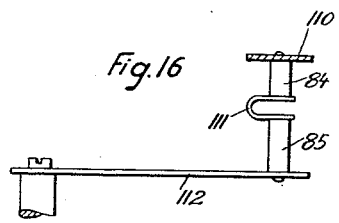
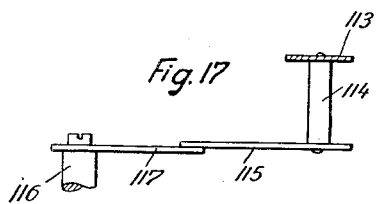
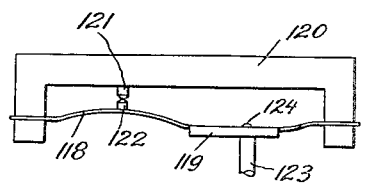
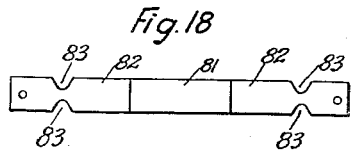
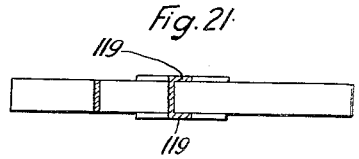
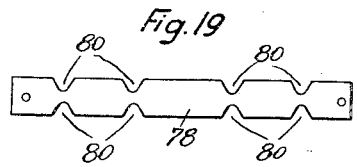
Inventor
BRUNO GRAFF
ATTORNEY United States Patent Office 2,809,258
Patented Oct. 8, 1957

2,809,258

SNAP SWITCH, PARTICULARLY FOR A TEMPERATURE CONTROLLER

Bruno Graff, Berlin-Zehlendorf, Germany

Application June 7, 1956, Serial No. 589,975

13 Claims. (Cl. 200—138)

My invention relates to a snap switch comprising a switch spring leaf which is pre-stressed by a longitudinal compression stress producing a tendency of the spring leaf to snap from an instable central position to one or the other of two end positions. Snap switches of this type are particularly adapted for temperature controllers in which a temperature-responsive element, such as a bi-metal strip, produces an actuating force acting on the spring leaf and causing it to snap from one position to the other.

In known snap switches of this type the ends of the spring leaf are pivotally mounted on a support. Particularly, the ends of the spring leaf may form sharp edges which by the longitudinal compression stress set up in the spring are held in engagement with concave bearing faces of the support. Such pivotal mounting, however, necessarily involves friction and wear.

It is the object of the present invention to provide an improved snap switch in which any friction between the spring leaf and the support is avoided to thereby increase the reliability in operation and the longevity of the switch.

It is another object of the present invention to provide a snap switch of the type indicated in which the separation of the contacts is effected more abruptly at an increased speed to thereby reduce sparking.

Another object of the invention is the provision of an improved temperature-control switch which is reliable and accurate in operation, capable of easy adjustment to different temperatures, compact and simple in design, and composed of a minimum of parts to thereby reduce the cost of manufacture.

Further objects of the invention will appear from the detailed description of a number of embodiments following hereinafter with reference to the drawings. It is to be understood, however, that the terms and phrases used in such detailed description have been chosen for the purpose of illustrating the invention rather than that of restricting or limiting the same, the features of novelty for which patent protection is sought being pointed out in the appended claims.

In the drawings,

Fig. 1 is an elevation, partly in section, of a snap switch used to control the temperature of an electric iron, the snap switch being of a type in which the contact carried thereby and the point of engagement of the actuating force with the spring leaf is located in a stiffened central section thereof, Fig. 2 is a plan view of the snap switch shown in Fig. 1, the adjusting knob being omitted, Fig. 3 is a more or less diagrammatic elevation of a modified snap switch of a type in which the point of engagement of the actuating force only is located in the stiffened central section of the spring leaf, whereas the contact carried by the spring leaf is spaced from such stiffened section, the neutral position of the spring being shown in full lines, whereas its end positions are shown by dotted lines, Fig. 4 is a more or less diagrammatic elevation of a snap switch differing from that shown in Fig. 3 by the provision of abutments for the spring leaf, Fig. 5 illustrates the same switch shown in Fig. 4 with the spring assuming another position, Fig. 6 is an illustration similar to that of Figs. 3, 4 and 5 of a snap switch in which the actuating member is rigidly connected with the spring leaf, Fig. 7 illustrates a snap switch similar to that shown in Fig. 4 in which the actuating member engages the spring at a point spaced from the stiffened section of the spring, Fig. 8 is an elevation of a snap switch similar to that shown in Fig. 3 in which the actuating member is formed by a laterally projecting arm, Fig. 9 is a snap switch similar to that shown in Fig. 6 and differing therefrom in that the stiffened section has the same thickness as the more resilient end sections of the spring leaf, Fig. 10 illustrates a snap switch similar to that shown in Figs. 6 and 7 in which the contact carried by the support is mounted in a resilient and adjustable manner, Fig. 11 shows a snap switch including a spring leaf having two spaced stiffened sections, Fig. 12 shows a snap switch in which the actuating member is formed by a bimetal strip stiffening a central section of the spring leaf, Fig. 13 is an elevation of a snap switch in which one of the ends of the spring leaf only is rigidly secured to the support, the other end being secured to a bimetal strip, Fig. 14 illustrates the switch shown in Fig. 13 with the element thereof assuming another position, Fig. 15 is an elevation of a switch in which one of the contacts is carried by the actuating member and acts on the spring to move same through the instable central position, Fig. 16 is a cross section through a switch similar to that shown in any one of the Figs. 3, 4 and 5 in which the actuating member comprises a pair of relatively movable elements connected by a spring.

Fig. 17 is a cross section through a switch similar to that of Fig. 16 in which a bimetal strip acting on the actuating member is connected to the support by means of a spring, Fig. 18 is a plan view of an elongated switch spring leaf in which the more resilient sections are rendered more flexible by lateral recesses, Fig. 19 is a plan view of a switch spring leaf in which the more resilient sections are each rendered more flexible by a plurality of recesses, Fig. 20 is an elevation of a snap switch in which the central section of the switch spring leaf is stiffened by lateral flanges, and Fig. 21 is a bottom view of the spring leaf shown in Fig. 20, cross sections of the spring leaf being inserted in such figure.

On the bottom plate 30 of an electric iron a column composed of blocks 31, 32 and 33 interconnected by suitable screws is mounted. Holders 34 and 35 carrying terminal connecting screws are interposed and clamped between such blocks. A spring leaf 36 is interposed and clamped between the block 33 and the holder 35 and extends laterally from the column and carries a substantially horizontally disposed elongated frame 37 of a suitable insulating material, such as ceramic material, for resilient upward and downward movement. The blocks 31, 32 and 33 likewise consist of a suitable insulating material. An elongated switch spring leaf 38 is carried by the frame 37, the ends of the spring leaf being rigidly clamped to the end members of the frame, for instance by rivets 39 and 40, the spring leaf 38 extending across the opening of the frame. A transverse bridge member 41 is carried by the side members of the frame being so disposed as to span the opening of the frame and the spring leaf thereabove. The bridge member is provided with a tapped bore accommodating an adjusting screw 42 constituting an abutment limiting the deflection of the spring leaf 38.

When the spring leaf 38 is disassembled from the frame 37 and is in relaxed condition, the distance of the holes serving to accommodate the rivets 39 and 40 is somewhat larger than the distance between the rivets 39 and 40. Therefore, when the spring leaf 38 is fixed to the supporting frame 37 it will be pre-stressed by a longitudinal compression stress producing a tendency of the spring 38 to snap from an instable central position to one or the other of two end positions. For enabling the spring to be so pre-stressed its end section disposed at the left with reference to Fig. 1 is formed with corrugations. For a purpose which will be described later its central section spaced from the ends of the spring leaf is stiffened so as to be practically non-resilient. Hence, the spring leaf includes two end sections of greater resiliency and a central section therebetween of lesser resiliency. When the spring snaps to its upper end position its stiffened section 43 engages the adjustable stop 42. When the spring leaf snaps to its lower position, however, a contact 44 secured to the stiffened section of the spring leaf at the bottom thereof engages a counter-contact 45 which is mounted on the support 37, preferably by resilient means. In the embodiment of the present invention illustrated in Fig. 1 such resilient means is formed by a spring leaf 46 extending beneath the frame 37 and having its left end secured thereto by suitable means not shown, whereas the right end of the spring leaf 46 is provided with a tapped bore engaged by a threaded stem of the contact 45, such threaded stem carrying a counternut 27 for the purpose of adjustment. The contact 45 is located within the opening of the frame 37 beneath the contact 44 carried by the stiffened section of the spring 38. A flexible conductor 47 connects the spring leaf 46 with the terminal holder 34. The other terminal holder 35 is electrically connected with the contact 44 through the intermediary of the spring leaf 36 and the spring leaf 38.

Moreover, the frame 37 is provided with a bore accommodating an actuating member in form of a pin 48 which may engage the right hand end of the stiffened section 43 of the snap spring leaf from below and is controlled in dependence on the temperature by a temperature-detecting element. As long as the temperature is below a predetermined limit the spring leaf 38 assumes a position beneath its instable central position and, therefore urges its contact 44 against the contact 45 whereby the circuit for heating the electric iron is established. When the temperature of the bottom plate 30 of the electric iron exceeds a certain limit, however, the temperature-detecting element will lift the stiffened section 43 at the right hand end thereof. During the initial phases of this lifting operation the longitudinal compression stress set up in the spring leaf 38 and more particularly in the corrugations thereof holds the contact 44 in engagement with the contact 45 while the stiffened section 43 of the leaf is slightly tilted by the ascending pin 48. This tilting motion continues until the spring leaf passes through its neutral condition and abruptly snaps upwardly away from the contact 45 and the pin 48 and engages the stop screw 42, whereby the contacts 44 and 45 are separated interrupting the circuit heating the electric iron.

In the embodiment of the invention illustrated in Figs. 1 and 2 the temperature-responsive element is a bimetal strip 49 mounted in a recess 50 of the bottom plate 30 of the electric iron, such bimetal strip having its left end clamped to the bottom plate 30 by means of the insulating block 31. On its right end the bimetal strip carries a plate 51 which projects beyond the bimetal strip and has an insulating lining 52 on which the actuating pin 48 is supported. When the temperature of the electric iron is low the parts assume the position illustrated in Fig. 1.

As the temperature rises the bimetal strip 49 is flexed upwardly so that its top face will become convex whereby the plate 51 will lift the actuating pin 48. A layer 53 of insulating material serves to insulate the spring leaf 46 from the bimetal strip 49.

For the adjustment of the temperature limit at which the snapping action of the switch is effected, the level of the insulating frame 37 may be adjusted. This frame has two lateral projections 54 resting on a pair of parallel arms 55 of a tiltable frame 56 mounted for adjustment about a horizontal axis on the insulating block 33 whereby the pair of arms 55 may be rocked up and down. The frame 56 has a recess 57 through which a vertical threaded spindle 58 extends, such spindle being rotatably mounted in a supporting plate 59 mounted on the insulating block 33. A nut 60 is engaged by the threaded spindle 58 and slots 61 are provided in the side faces of such nut. These slots are engaged by the opposed edges of the recess 57 of the frame 56. By rotation of the spindle with the aid of a knob 62 the nut 60 may be moved upwardly or downwardly. Such movement causes the nut to rock the frame 56 and the arms 55 thereof. The spring 36 tends to maintain the projections 54 of the frame 37 in engagement with the arms 55. When the bimetal 49 is considerably flexed, however, it may lift the frame 37 causing the projections 54 thereof to be lifted from the arms 55, whereby the bimetal strip is protected from a permanent deformation which, in event of a rigid connection of the frame 37 to the arms 55, would be liable to occur when the knob 62 is adjusted to a low temperature at a time when the bottom plate 30 has a high temperature.

For protecting the switch from dust the top of the frame 37 may be closed by a cover 63 indicated by dotted lines.

The spring leaf 46 carrying the contact 45 may be formed as a heating resistance adapted to heat the bimetal strip 49. As a result, the temperature difference existing between the temperature causing the electrical circuit to be closed and the temperature causing the electrical circuit to be interrupted will be reduced. When the parts assume the position shown in Fig. 1 the heating circuit is closed. When the temperature rises above the cut-off limit the spring leaf 38 snaps upwardly and separates the contacts 44 and 45 and moves to engagement with the stop 42. Now the temperature of the iron drops. In the intitial phases of the drop of temperature the left end of the stiffened section 43 of the spring leaf remains in contact with the stop screw 42, whereas the right end of the stiffened section 43 drops gradually until the spring leaf 38 passes through its neutral condition and snaps downwardly to thereby close contacts 44 and 45 again. Ordinarily the turn-on temperature is somewhat lower than the cut-off temperature. The difference between the two temperature limits is reduced by the above described heating effect exerted by the spring leaf 46 upon the bimetal strip 49.

The stiffening of the spring leaf 38 throughout its central section 43 may be effected in various ways, for instance by increasing the thickness of the spring leaf within this central section by a coextensive metal strip soldered to the spring leaf 38.

The snap switch described adapted to abruptly separate and engage the contacts 44 and 45 to thereby avoid sparking between the contacts and the consequent wear and radio disturbance, excels by its safe operation, its longevity and its ability to operate at comparatively high temperatures which may amount to 240° C. for instance, provided that a heat-resistant spring metal is chosen for the spring leaf 38. Also the snap switch excels by the low mass of its movable elements whereby the impact, wear and noise incidental to its operation are reduced to a minimum. Since the spring leaf 38 is mounted to its support 37 without the use of any pivots, no friction and consequent wear will occur between the spring leaf and the support.

The novel snap switch described including an elongated spring leaf instable in a central position because of a suitable bias and thus tending to snap into one or the other of its end positions, such spring leaf being rigidly clamped to its support without any pivotal connection therebetween, may be modified in numerous ways.

Thus, Fig. 3 illustrates an embodiment in which the ends of a spring leaf 66 are rigidly clamped in a support 65. A central section 67 of the spring leaf is stiffened again. The non-stiffened end section at the left is corrugated. The spring leaf is pre-stressed by a longitudinal compression bias and, therefore, tends to snap from its instable central position B illustrated in full lines upwardly or downwardly into the positions A or C shown in dotted lines. The spring leaf 66 carries an electrical contact 68 in spaced relationship to the support 65, such contact being adapted to engage a stationary countercontact 69 carried by the support. A suitable actuating member not shown may exert an actuating force $k1$ or $k2$ upon the spring leaf at a point spaced from both the support 65 and the contact 68. If it is desired to move the spring leaf from the position A to the position C, the actuating force $k1$ must be rendered effective to displace the spring leaf. Such displacement will cause the spring leaf to snap into the position C. By then applying the actuating force $k2$ the spring leaf may be restored to the position B causing it to snap back to the position A.

The snap which shown in Fig. 3 differs from that shown in Fig. 1 by the disposition of the contact 68 on the non-stiffened, highly resilient corrugated end section of the spring leaf, whereas in Fig. 1 the contact is mounted on the non-resilient central section of the spring leaf. Moreover, in the snap switch of Fig. 3 the contact is mounted on the top of the spring leaf, whereas in Fig. 1 it is mounted at the bottom thereof. A further difference resides in that in Fig. 3 the spring leaf is in a stable condition in both end positions A and C tending to remain therein owing to its bias, whereas the spring leaf 38 in Fig. 1 is in a stable condition in its lower position only. When it assumes its upper position in engagement with the stop 42 then it requires pressure exerted by the actuating pin 48 in order to maintain the spring leaf in such upper position. When the spring leaf is relieved from the pressure exerted by the actuating pin 48 it commences its downward motion. The various phases of this motion are illustrated in Figs. 4 and 5.

In Figs. 4 and 5 the support 37 is indicated diagrammatically. The opposite ends of the spring leaf 38 are firmly clamped to the support 37, the central section 43 of the spring leaf being stiffened. The actuating pin 48 exerts the force $k3$. The stop 42 limits the snapping motion of the spring leaf in upward direction and the contact 45, which for sake of simplicity is shown as being stationary, limits the snapping motion in downward direction. The lowermost position of the spring leaf is indicated in full lines in Fig. 4.

When the force $k3$ exerted by the actuating member 48 increases it will flex the right hand end section of the spring leaf upwardly moving the central stiffened section 43 to the inclined position E indicated by dotted lines. In this position the spring leaf is in its instable condition. It will be noted that in this first phase of the operation when the spring leaf moves from its lowermost position to the position E, the contacts 44 and 45 in Fig. 1 will remain closed. As soon as the spring leaf is lifted beyond the position E it will snap abruptly into its uppermost position F, the stiffened central section 43 being tilted under the effect of the bending stress set up in the spring leaf at 70 causing the left end of the stiffened section to swing upwardly. In the position F the spring leaf is kept by the force $k3$, as illustrated in Fig. 5 in full lines, provided that the force $k3$ is sufficiently powerful to overcome the effect of the bending stress set up in the spring leaf 38 at 71. As soon as the force $k3$ decreases so as to be overcome by such bending stress, the stiffened central portion of the spring leaf will first move into the inclined position indicated in Fig. 5 by dotted lines, such inclined position resulting in a substantially stable condition of the spring leaf. Only upon a further reduction of the actuating force $k3$ will the snapping action occur whereby the spring leaf will snap into the position H. In this snap switch with an actuating force acting in a negative direction, as indicated in Fig. 3 by the arrow $k2$, is not required. Hence, it will appear that the spring leaf because of the effect of its stiffened central section 43 is capable of assuming two positions in which it is in a substantially stable condition, such positions being the position indicated in Fig. 4 at E and the position indicated in Fig. 5 at G.

In Fig. 6 I have indicated a snap switch differing from that shown in Fig. 3 and that shown in Figs. 4 and 5 by the fact that the actuating pin 72 does not engage the stiffened section 43 but rather engages the non-stiffened right hand end section being rigidly fixed thereto, for instance by a rivet, any pivotal connection being avoided. This offers the advantage that no wear may occur between the spring leaf and the actuating member. The snapping operation is the same as that explained hereinabove with reference to Figs. 4 and 5.

In the embodiment illustrated in Fig. 7 the point of engagement of the actuating member with the spring leaf is located in the non-stiffened, highly resilient right hand end section of the spring leaf just as in the embodiment of Fig. 6. The actuating pin 73, however, acts on the spring leaf without being rigidly connected thereto, the operation being similar to that described hereinabove with reference to Figs. 1 and 2.

In the embodiment of the snap switch illustrated in Fig. 8 the actuating pin has been replaced by an arm 74 which is riveted to the spring leaf and projects laterally out of the supporting frame 75. The right hand end of this arm may be mounted for pivotal movement about a stationary point. The actuating forces $k5$ or $k6$ will act on this arm, such forces setting up bending stresses in the highly resilient right hand end section of the spring leaf 76, such bending stresses initiating the snapping action. The snapping operation occurs in the manner explained with reference to Fig. 3.

This embodiment may be modified by securing the arm 74 to the stiffened section 77 of the spring leaf rather than to the resilient section 76. This modification is particularly well adapted for such cases where the actuation is to be effected by a torsional force. This torsional force is caused to act on the arm 74 about the pivotal axis (not shown) thereof.

In Fig. 9 I have illustrated a snap switch differing from the embodiments described hereinabove by the fact that the stiffened section has the same thickness as the non-stiffened, highly resilient end sections of the spring leaf. In this embodiment the stiffening of the central section is effected by an increase of its width. Alternatively, the highly resilient end sections of the spring leaf may have the same width as the stiffened central section, but may be weakened by lateral recesses increasing the flexibility of the end section.

That is illustrated in Fig. 19 showing a spring leaf having a central section 78 of the same thickness as the highly resilient end sections which have their ends rigidly clamped in the support 79. The flexibility of the end sections may be also increased by lateral recesses where the central section is stiffened in the manner explained hereinabove with reference to Figs. 1 and 2.

That is illustrated in Fig. 18 showing a spring leaf having a central section reinforced by imposition of a plate 81 rigidly secured to the spring leaf, whereas the end sections 82 are provided with lateral recesses 83 increasing their flexibility.

The actuating pin 84 (Fig. 9) may be rigidly connected to the spring leaf, for instance by being riveted thereto, and may engage either the stiffened central section 78 or a more flexible section.

The embodiment illustrated in Fig. 10 differs from those described hereinabove with reference to Figs. 3 and 9 by the fact that the countercontact 85 is not rigidly mounted on the support 86 but is adjustably and resiliently mounted thereon. For this purpose, the contact 85 is mounted on the end of a spring leaf 87, the other end of such spring leaf being riveted to the supporting frame 86. The spring leaf 87 engages a setting screw 88 mounted in a tapped bore of the supporting frame 86 and serving to adjust the bias of the spring leaf 87. Otherwise this embodiment may be identical with that explained with reference to Figs. 4 and 5. The adjustability of the bias of the spring leaf 87 aids in assuring that the snapping operation will be effected in a rapid and reliable manner.

In the embodiment illustrated in Fig. 11 the spring leaf is stiffened throughout a pair of spaced sections 89 and 90. The section intermediate these stiffened sections is highly flexible being corrugated as shown at 91. The points where the contact is mounted on the spring leaf and where the latter is engaged by the actuating member may be chosen in accordance with any one of the examples described hereinabove and is not illustrated in Fig. 11.

In the embodiment of the snap switch illustrated in Fig. 12 the central section of the spring leaf 92 is stiffened by a bimetal strip 93 which is united rigidly with the spring leaf, for instance by soldering. As long as this bimetal strip 93 assumes a straight shape the spring leaf will remain in its lower position indicated in full lines. When the bimetal strip due to a change of temperature is bent upwardly it will set up a bending stress in the spring leaf causing same to move through its neutral condition and to snap into the position indicated by dotted lines. By this snapping effect the switch contacts will be engaged. In this embodiment, too, the two limit positions of the spring leaf could be predetermined by stationary and preferably adjusable stops. The bimetal strip 93 thus performs both functions, that of stiffening the central section of the spring leaf 92 and that of the actuating member.

In Fig. 13 I have illustrated a snap switch in which the switch spring leaf 94 has but one of its ends rigidly secured to the supporting frame. A central section of the spring leaf is stiffened by a plate 96 bonded to the spring. The right hand end of the spring leaf 94 is riveted to the free end of a bimetal strip 97 by a rivet 101, the other end of the bimetal strip being rigidly clamped in the support 95 preferably in engagement with the end of the switch spring leaf 94. The spring leaf 94 is pre-stressed by a longitudinal compression bias. When the bimetal strip 97 assumes a certain temperature it will maintain the parts in the position illustrated in full lines in Fig. 13. In this position the stiffened section 96 of the spring leaf engages a rigid stop 98 mounted on the support 95, whereas the contact 99 mounted on the stiffened section of the spring leaf is disengaged from the countercontact 100 mounted on the bimetal strip 97. Upon a change of the temperature causing the bimetal strip to bend in a manner whereby its right hand end will be lifted, the parts will first move to a non-stable position in which the contacts 100 and 99 are still separated. Upon passage through this non-stable position, the parts will snap into the position indicated in Fig. 14 in which the stiffened central section of the spring leaf is slightly spaced from the stop 98, whereas the rivet connecting the spring leaf with the bimetal strip 97 engages the frame. In this position the contacts 99 and 100 engage each other. The stop 98 may be likewise formed by a contact. The snapping operation is promoted by the bending stress produced by the rivet joint 101.

A heating coil may be mounted on the bimetal strip 97 and may be supplied with current under the control by the contacts 99, 100. In this event, the snap switch acts as a blinker switch which automatically and periodically closes and interrupts the electrical circuit, for instance for the purpose of controlling blinker lights.

In the snap switch illustrated in Fig. 15 the point of engagement of the actuating force coincides with the point where the contact is located on the spring leaf, the actuating force being inserted on the reinforced section 102 of the spring leaf 104 by a pair of spaced abutments 105 and 106 mounted on the end of an actuating member, for instance on the end of a bimetal strip 107 having its other end rigidly secured to the support 103. In this embodiment, both ends of the switch spring leaf 104 are firmly clamped to the support 103. Whereas the abutment 106 is directly attached to the end of the bimetal strip 107, the abutment 105 is carried by a rigid arm 108 of the bimetal strip. The abutment 106 may be formed as an electrical contact which cooperates with a countercontact 109 mounted on the stiffened section 102 of the spring leaf.

The spring leaf 104 is pre-stressed by a longitudinal compression bias and, for this purpose, is provided with suitable corrugations. This bias produces a tendency of the spring leaf to snap from an instable central position to one or the other of two end positions. In Fig. 15 I have illustrated a condition in wheih the spring leaf tends to move downwardly and, therefore, engages the abutment 105 with a certain force. Upon a change of the temperature in a manner causing the bimetal strip 107 to rise, the abutment 106 will move the spring leaf 104 through its non-stable position and beyond the same causing the snapping operation ot occur whereby the spring leaf moves abruptly upwardly causing its stiffened central section to engage the abutment 105. If desired, the movement of the abutment 106 may be limited by a rigid stop mounted on the frame 103. In this embodiment, too, the bimetal strip 107 may be provided with a heating coil energized by an electric current controlled by the contacts 106 and 109. When the bimetal strip 107 is heated it will rise and move the abutments 105 and 106 upwardly. Then the snap switch shown in Fig. 15 will act as a periodical intermittent interrupter.

In Fig. 16 I have illustrated a cross section through a snap switch in which the actuating pin is riveted to the switch spring leaf. The transverse section through the switch shown in Fig. 16 may be that indicated by the line 16—16 of Fig. 6 or by the line 16—16 of Fig. 9. The actuating pin 84 is riveted to the spring leaf 110. In certain cases it may be desirable in spite of the rigid connection between the actuating pin and the spring leaf to permit the temperature-responsive element to move independently of the spring leaf. To this end, the actuating pin 84 is connected with a U-shaped spring leaf 111 to which an actuating pin 85 is attached, the pin 85 being disposed coaxially to the pin 84 and being rigidly secured to the temperature-responsive element 112 which may be constituted by a bimetal strip.

A similar effect may be attained in the switch illustrated in Fig. 17 showing a switch spring leaf 113 which is rigidly connected by the actuating pin 114 with the one end of a bimetal strip 115, the other end of such bimetal strip, however, being not rigidly secured to the support 116 but being secured thereto through the intermediary of an auxiliary spring leaf 117. This auxiliary spring leaf will protect the bimetal strip from excessive stresses resulting in a permanent deformation which, in the absence of the auxiliary spring, could occur when the bimetal strip tends to bend beyond the limits permitted by the switch spring leaf 113.

In Fig. 20 I have illustrated a snap switch differing from that illustrated in Fig. 3 essentially by the fact that the stiffening of the central section of the spring leaf 118 is effected in another manner. Whereas in the embodiment shown in Fig. 3 a strip or plate is bonded to the central section of the spring leaf to be reinforced, no such strip is provided in the embodiment shown in Fig. 20, the switch spring leaf 118 being simply provided with lateral downwardly bent flanges 119 so that the stiffened central section has a channel-shaped cross section as indicated in Fig. 21. Otherwise the snap switch shown in Figs. 20 and 21 is similar to that shown in Fig. 3. Thus, the spring leaf 118 has both of its opposite ends firmly clamped in the supporting frame 120 in a manner prestressing the spring leaf by a longitudinal compression bias. The contact 122 is mounted on the left highly resilient end section of the spring leaf and cooperates with a stationary contact 121 mounted on the supporting frame 120, such stationary contact acting at the same time as a stop limiting the upward movement of the spring leaf. The actuating member 123 is rigidly secured to the reinforced section of the spring leaf by a rivet or a screw 124.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A snap switch comprising a support, a switch spring leaf, including two end sections of greater resiliency and a central section therebetween of lesser resiliency, means for rigidly securing said end sections to said support and for pre-stressing said spring leaf by a longitudinal compression stress producing a tendency of said spring leaf to snap from an instable central position to one or the other of two end positions, a first contact carried by said spring leaf in spaced relationship to said support, a second contact mounted for engagement by said first contact in in one of said end positions, and an actuating member movable relative to said support for acting on said spring leaf to move same through said instable central position.

2. A snap switch comprising a support, a switch spring leaf, including two end sections of greater resiliency and a central section therebetween of lesser resiliency, means for rigidly securing said end sections to said support and for pre-stressing said spring leaf by a longitudinal compression stress producing a tendency of said spring leaf to snap from an instable central position to one or the other of two end positions, a first contact carried by said spring leaf in spaced relationship to said support, a second contact carried by said support for engagement by said first contact in one of said end positions and for disengagement by said first contact in the other one of said end positions, and an actuating member movable relative to said support between an active position and an inactive position, said actuating member in said active position engaging said spring leaf and causing it to snap to said other one of said end positions and when returning to its inactive position permitting said spring leaf to snap back to said one of said end positions.

3. A snap switch comprising a support, an elongated switch spring leaf including two end sections of greater resiliency and a central section therebetween of lesser resiliency, means for rigidly clamping said end sections to said support and for pre-stressing said spring leaf by a longitudinal compression stress producing a tendency of said spring leaf to snap from an instable central position to one or the other of two end positions, a first contact carried by said spring leaf between its ends, a second contact carried by said support for engagement by said first contact in one of said end positions and for disengagement by said first contact in the other one of said end positions, and an actuating member mounted for relative movement with respect to said support and for engagement with said spring leaf at a point spaced from said first contact to thereby cause said spring leaf when the same assumes said one of said end positions to snap to said other one of said end positions.

4. A snap switch as claimed in claim 1 further comprising means for stiffening a central section of said spring leaf spaced from the ends thereof, said central section carrying said first contact.

5. A snap switch as claimed in claim 2 further comprising means for stiffening a central section of said spring leaf spaced from the ends thereof, said central section carrying said first contact and being disposed for engagement by said actuating member.

6. A snap switch as claimed in claim 1 in which said spring leaf includes two resilient end sections and a stiffened, practically non-resilient central section therebetween.

7. A snap switch as claimed in claim 1 in which said spring leaf includes two resilient end sections and a stiffened, practically non-resilient central section therebetween, said non-resilient section being rigidly connected with said actuating member.

8. A snap switch as claimed in claim 1 in which said actuating member is composed of two rigid elements and a resilient element connecting said rigid elements, one of said rigid elements being rigidly connected to said spring leaf and the other one being connected to actuating means.

9. A snap switch as claimed in claim 1 further comprising means for resiliently and adjustably mounting said second contact on said support.

10. A snap switch as claimed in claim 1 further comprising a stiffening plate rigidly connected to a central section of said spring leaf and spaced from the ends thereof.

11. A snap switch as claimed in claim 1 in which said actuating member is a bimetal strip coextensive with and secured to a central section of said spring leaf spaced from the ends thereof.

12. A snap switch as claimed in claim 1 in which said actuating member forms part of a temperature-responsive mechanism for causing said spring leaf to snap to the contact-disengaging position in response to a predetermined change of temperature.

13. A snap switch as claimed in claim 3 in which said support is formed by an elongated frame of insulating material accommodating said elongated spring leaf and by a transverse bridge member spanning said frame and said spring leaf, said snap switch further comprising an adjustable stop mounted on said bridge member for engagement with said spring leaf in said other one of said end positions.

References Cited in the file of this patent

UNITED STATES PATENTS

| | | |
|---|---|---|
| 2,133,309 | Schmidinger | Oct. 18, 1938 |
| 2,191,670 | Kuhn et al. | Feb. 27, 1940 |
| 2,394,121 | Ulanet | Feb. 5, 1946 |